United States Patent Office 3,205,058
Patented Sept. 7, 1965

3,205,058
METHOD FOR CONTROLLING UNDESIRED GRASSES
John Keith Leasure, Midland, Mich., assignor to The Dow Chemical Company, Midland, Mich., a corporation of Delaware
No Drawing. Filed Aug. 16, 1962, Ser. No. 217,301
7 Claims. (Cl. 71—2.3)

This invention relates to the modification of the growth of germinant seed and emergent seedlings and is particularly directed to a method and composition for the selective suppression of the growth of germinant seeds of many undesirable plant species employing certain substituted phenones.

In recent years, use of chemical materials for modifying the growth of vegetation has found widespread acceptance. The practice of such control, however, has disclosed certain disadvantages in commonly employed procedures. For example, many of the materials heretofore proposed for the control of plant growth have the property of controlling selectively only broadleaf species. Further, many of the currently used materials are as toxic to established desirable plants as they are to weeds. Thus, it has been possible in only a few instances to obtain a selective control of small seeded, annual weeds, particularly grasses, from the broadleaf crop plants and the like.

It is an object of the present invention to provide a novel composition for modifying the growth of plants. It is a further object to provide a new herbicide and a method utilizing the same for the control of the growth of germinant seed of many undesirable plants in soil or growth media, and particularly, for the control of annual grass seeds. Another object is to provide a new herbicide and a method utilizing same for the selective suppression of the growth of annual grasses in stands of established desirable plants. Other objects will become apparent from the following specification and claims.

In accordance with the present invention, it has been found that the growth of many plants may be modified and controlled by contacting the germinant seed and emerging seedlings thereof with a growth-modifying amount of substituted phenone having a molecular weight of at least 179 and characterized by the formula

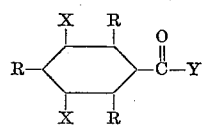

(I)

wherein R may be individually hydrogen or a lower alkyl radical containing from 1 to 4 carbon atoms, each X may be independently hydrogen or a nitro group and Y represents an alkyl group containing from 1 to 3 carbon atoms, inclusive. In a further aspect of the invention, novel compositions are provided comprising the above substituted phenones in intimate mixture with finely divided carriers and/or wetting and dispersing agents. It is among the advantages of the invention that these compounds have a relatively high degree of toxicity for the seed and emerging seedlings of many undesirable annual grasses and little or no modifying effect for seed of broadleaf plants or for established stands of either grasses or broadleafed plants. Thus, the compounds may be employed for the selective control of annual grasses, either alone or in stands of established plants.

Although the precise theoretical basis therefor is not completely understood, the molecular weight limitation in the foregoing definition of the active compounds appears to be critical for obtaining compounds having the desired high degree of growth modifying activity. An alternative method of defining the effective substituted phenone compounds of the invention may be stated as follows. The active growth-modifying substituted phenones are those characterized by Formula I above, in which, when one or both of the X substituents represents a nitro group, each R may be individually hydrogen or a lower alkyl radical provided that the radicals represented by R and Y contain a total of at least 2 carbon atoms, but when both X's represent hydrogen, the radicals represented by R and Y must, taken together, contain a total of at least 6 carbon atoms.

In operating in accordance with the invention, the active substituted phenone compound is distributed in or on soil or other growth media infested with the seeds of the vegetation to be controlled. Any suitable means of distribution may be employed, provided that the active compound is positioned so as to contact the seed and emerging seedlings of the undesirable species. The exposure of plants and plant parts to the action of the substituted phenones of the invention gives rise to varying degrees of response in many germinant seeds, emergent seedlings and growing plants, depending upon the type of plant, the age and nature of the plant part contacted, the stage of growth of the plant and the dosage of the active material employed. When very large dosages are dispersed in growth media, a persistent inhibition of the growth of seeds and emerging seedlings of most grasses is obtained. The weathering action of the sun and rain and other elements of the soil environment eventually reduces the concentration of the growth modifying chemicals in the growth media. In some cases, the application of controlled, small dosages of certain of the active compounds controls the growth of seeds of small seeded grasses without substantial effect upon the growth of large seeded grasses such as corn. Thus, it is possible to effect a selective control of many undesirable annual grass seeds such as crabgrass, fox-tail, millet and wild oats in established stands of crop plants. The term "growth media" as herein employed is inclusive of peat, humus, compost and potting mixtures and the like, as well as the various field soils.

The exact dosage of the active phenone compound to be employed is dependent upon such factors as the type of growth medium, the particular substituted phenone employed, the depth to which the toxic compounds are distributed in the soil and the amount of rainfall, as well as upon the plant species to be controlled. Good results have been obtained when germinant seed of grasses have been contacted with dosages of from about 2 to 50 pounds or more of one of the substituted phenone compounds per acre, distributed in the soil zone containing germinative seeds, usually the upper 1 to 4 inches of soil. With 2',4',6'-triisopropyl-acetophenone and 2',4',6' - triisopropyl - 3' - nitro - acetophenone, which constitute preferred compounds of the invention, excellent selective control of annual grasses in the presence of desirable broadleaf crop seed is obtained by distributing from about 2 to 20 pounds of said compounds per acre in the above-described fashion.

In carrying out the invention, the substituted phenone compounds may be formulated to provide either dust or spray compositions. Dust compositions are readily prepared by intimately mixing one of the active substituted phenone compounds with a finely divided inert solid such as talc, pyrophyllite, gypsum, clay, ground limestone, diatomaceous earth or the like. Similarly, finely divided mixtures of the substituted phenones with fertilizers, peat or other soil conditioners may be used.

Where the mixture of substituted phenone and solid diluent is to be applied as a dust, the inclusion of wetting, sticking and emulsifying agents in the described finely divided compositions is optional. Where it is desired to apply the active ingredient as a dispersion in water, one embodiment of the invention consists of a finely divided mixture including the active toxicant and a suitable surface-active dispersing agent, such mixture being employed as a wettable concentrate.

Similarly, granular compositions containing the active substituted phenones may be prepared. Such compositions preferably contain a preponderance of granules which pass through a sieve having 8 meshes to the inch while being substantially free of particles which pass through a sieve having 100 meshes to the inch. Granular compositions may be prepared by conventional granulation techniques from one of the aforementioned finely divided mixtures. Alternatively, a solution of one of the substituted phenones in a volatile organic solvent may be adsorbed on and into preformed granules of inert solid carrier so as to distribute the active compound in such granules.

Wetting, emulsifying and surface-active dispersing agents suitable for use in the present compositions include alkaline caseinates, blood albumin, alkali metal salts of long chain aliphatic sulfates and of alkyl aryl sulfonates, sulfonated derivatives of petroleum and of naturally occurring glycerides, sulfonates prepared from phenols and aromatic acids, soaps, lignin sulfonate derivatives, clays such as bentonite or attapulgite, and condensation products of alkylene oxides with phenols, organic acids, alkanolamines, complex ether-alcohols, polyglycols or hexitan esters, and the like. In utilizing the clay minerals as dispersing agents, it is frequently desirable to utilize an excess of such agent over and above the minimum necessary for dispersing the composition, the excess clay mineral then acting as a finely divided diluent and carrier.

In an alternative method of carrying out the invention, the substituted phenone compound is dissolved in a suitable organic solvent together with an emulsifying agent to prepare an emulsifiable liquid concentrate suitable for dispersion in water or dilution with oil to prepare dilute spray mixtures. In this embodiment of the invention, the preferable emulsifying agents are oil soluble and particularly include the non-ionic emulsifiers such as the condensation products of alkylene oxides with various agents as described above. Oil-soluble ionic emulsifiers such as long chain alkyl aryl sulfonates may also be employed. Suitable organic solvents include petroleum distillates, aliphatic ketones and alcohols, liquid halo-hydrocarbons, liquid aromatic hydrocarbons and the like.

The proportions of materials employed in the compositions may vary considerably, depending on how the composition is to be employed, and whether or not it is designed as a concentrate. Dust compositions for direct application to soil may contain from as little as 0.25 percent to 50 percent or more by weight of the active ingredient. For use as a concentrate in the preparation of sprays or more dilute dusts, the compositions of the invention may contain from 10 percent to as high as 90 to 95 percent by weight of the active substituted phenone ingredients, the balance of the composition being one of the diluents and carriers and/or wetting and surface-active dispersing agents previously mentioned. Liquid dispersions of the toxicant in water or an organic solvent similarly may vary in concentration from a very low percentage of the active ingredient, e.g., 0.01 to 15.0 percent by weight where the dispersion is to be applied to the soil, to a relatively high percentage, e.g., 5 to 50 percent by weight, or higher, where the dispersion is to be employed as a concentrate.

The compositions of the present invention are conveniently applied to or dispersed in the soil by either spring or dusting. Alternatively, they may be dispersed in irrigation water and so distributed over and through the soil. The techniques involved in the application of spray and dust mterials are well established and conventional equipment suffices in the present situation. It is required, however, that relatively uniform distribution of the treating compositions be obtained and that the compositions as deposited on or in the soil provide a toxic concentration of the active ingredient so positioned as to contact the organs or emerging seedlings of the undesired vegetation. Where dusting is employed, the surface of the soil may be dragged or otherwise worked to distribute the toxicant. In general, the toxic ingredient is distributed through the upper inch or less of the growth medium when practicing preemergent and selective weed control.

The compounds employed in the present invention may be prepared by known methods. In one such method, one molar proportion of benzene or a substituted benzene of the formula

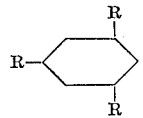

wherein R has the aforementioned significance is blended with a catalytic amount of a Friedel-Crafts catalyst such as anhydrous aluminum chloride and about one molar proportion of an alkanoyl chloride of the formula Y—COCl is added thereto portionwise with just sufficient heating to maintain the reaction. Reaction is evidenced by the evolution of hydrogen chloride. On completion of the reaction, the phenone products are separated by pouring the reaction mixture over crushed ice and extracting the resulting aqueous mixture with a water-immiscible solvent. The products can be isolated and purified by conventional procedures such as distillation, washing and crystallization. Nitro groups can be introduced into phenones, prepared as above, by the conventional nitration reaction using a mixture of concentrated nitric and sulfuric acids.

The following examples illustrate the invention but are not to be construed as limiting the same.

*Example 1*

40 parts by weight of 2',4',6'-triisopropyl-3'-nitro-acetophenone (molecular weight: 291), 0.8 part of sorbitan trioleate (Span 85) and 0.2 part of a sorbitan monolaurate polyoxyethylene derivative (Tween 80) were dispersed in about 316 parts of acetone to produce a concentrate composition in the form of a water dispersible liquid. 2',4',6'-triisopropyl-3'-nitro-acetophenone is a pale yellow powder, melting in the range of 78°–88° C., somewhat soluble in acetone and alcohol and substantially insoluble in water. Portions of the above concentrate compositions were dispersed in water to produce aqueous spray compositions containing 0.0172, 0.0432 and 0.172 pound of 2',4',6'-triisopropyl-3'-nitro-acetophenone per hundred gallons of ultimate mixture. These aqueous compositions were employed for the treatment of soil previously fitted and planted with seed of a variety of plants, and observations were subsequently made of the control of the growth of the seeds and emergent seedlings of said plants. In the treating operations, the aqueous spray compositions were applied as a soil drench at a rate of about 0.434 acre-inch of aqueous composition per acre to supply substantially uniform dosages of about 2, 5 and 20 pounds, respectively, or 2',4',6'-triisopropyl-3'-nitro-acetophenone per acre. These dosages correspond, respectively, to concentrations of about 3.2, 8 and 32 parts by weight of the acetophenone compound per million parts by weight of soil. Other areas similarly seeded with the test plant species were left untreated to serve as checks.

After about 4 weeks, the areas were examined to ascertain what control of the growth of seeds and emerging seedlings had been obtained. The results are set forth in the following table.

| Seed Species | Percent Control of Growth of Seeds and Emerging Seedlings at the Indicated Dosages (lbs./acre) in the Treated Seed Beds | | |
|---|---|---|---|
| | 20 | 5 | 2 |
| Broadleafs: | | | |
| Marigold | 0 | 0 | 0 |
| Cucumber | 0 | 0 | 0 |
| Pinto Bean | 0 | 0 | 0 |
| Radish | 0 | 0 | 0 |
| Grasses: | | | |
| Crabgrass | 100 | 99 | 98 |
| German Millet | 100 | 100 | 100 |
| Japanese Millet | 100 | 100 | 99 |
| Corn | 98 | 60 | 0 |
| Wild Oats | 99 | 60 | 0 |
| Sudan Grass | 100 | 99 | 85 |
| Meadow Fescue | 100 | 100 | 90 |

At the time of the observation, the untreated check beds were found to support luxuriant and vigorously growing stands of the named plant species.

*Example 2*

The aqueous emulsion spray composition containing 0.0172 pound of 2′,4′,6′-triisopropyl-3′-nitro-acetophenone, prepared as in Example 1, was applied by the method of said Example at a dosage of about 20 pounds per acre to provide a concentration of about 32 parts by weight of the acetophenone compound per million parts by weight of soil to areas planted with a further variety of broadleaf vegetable and field crop seed. The seed species employed were cabbage, soy bean, cotton, lettuce, flax, alfalfa, watermelon, turnip, parsnip, peanut, spinach and tobacco. Similarly planted areas of soil were maintained without chemical treatment to serve as checks. All areas were watered regularly as required and maintained under good growing conditions. On observation about 4 weeks after treatment, it was found that the test species in the treated areas had emerged and were growing in numbers and vigor substantially equal to that of the corresponding plant species in the untreated check areas.

*Example 3*

The plant species employed in Example 1 were planted in areas of fertile soil and maintained under good growing conditions until plants had emerged and achieved a growth of about 2 inches in height. The concentrate composition of Example 1 was dispersed in water to provide an aqueous composition containing 10,000 parts by weight of 2′,4′,6′-triisopropyl-3′-nitro-acetophenone per millon parts of finished spray, and the resulting aqueous spray composition was applied by spraying to the above described growing plants at a rate to provide thorough wetting of the above-ground portions of the plants, such rate corresponding to the application of about 32 pounds of the 2′,4′,6′-triisopropyl-3′-nitro-acetophenone compound per acre. Thereafter, the sprayed plants and similarly grown untreated check plants were maintained under good growing conditions for a period of several weeks. No injury or other growth modification of the treated plants attributable to the treatment could be observed.

*Example 4*

A concentrate composition was prepared by the method of Example 1 and according to an identical formulation, except that the 2′,4′,6′-triisopropyl-3′-nitro-acetophenone in the composition of Example 1 was replaced by 2′-methyl-3′,5′-dinitro-acetophenone (molecular weight: 224). The resulting concentrate composition was dispersed in water to produce an aqueous spray composition containing 0.172 pound of the named active phenone compound per 100 gallons of ultimate mixture. The resulting aqueous composition was employed for the treatment of soil previously fitted and planted with seed of soy bean, cotton and morning glory, representative of broadleaf species, and with crabgrass, an undesirable grass species. In the treating operations, the aqueous spray composition was applied to the planted areas in the form of a soil drench at the rate of about 0.434 acre-inch of aqueous composition per acre to supply a substantially uniform dosage of about 20 pounds of the active phenone compound per acre, corresponding to a concentration of about 32 parts by weight of phenone compound per million parts by weight of soil. Other areas similarly seeded with the test plant species were left untreated to serve as checks. All areas were maintained under good growing conditions and subsequently observed to ascertain what modification of the growth of seeds and emergent seedlings had been obtained. On examination 4 weeks after treatment, it was found that all of the test plant species in the untreated check beds had emerged and were growing vigorously. Similar emergence and growth of the broadleaf species were observed in all the treated areas. In contrast, the treated areas showed substantially no emergence or growth of crabgrass.

*Example 5*

Following the procedure of Example 1, water-dispersible concentrate compositions were prepared containing 2′,4′,6′-triethylacetophenone (molecular weight: 204) or 2′,4′,6′-triisopropyl-acetophenone (molecular weight: 246). A portion of each such concentrate composition was dispersed in a separate portion of water to produce aqueous spray compositions containing 0.172 pound of one of the substituted phenone compounds per hundred gallons of ultimate mixture. These spray compositions were applied by the method of Example 1 to provide dosages of about 20 pounds of active compound per acre to separate areas of fertile soil previously fitted and planted with seed of soy beans, radish and morning glory, representative broadleaf species and with seed of crabgrass and Johnson grass, representative undesirable grass species. Similarly planted areas were left unsprayed to serve as checks. After about 4 weeks, all areas were examined to ascertain any modification of growth attributable to the treatments. At the time of the observations, the untreated check areas were found to support luxuriant and vigorously growing stands of the test species planted. Similar vigorous stands of the broadleaf species were observed in the areas treated with 2′,4′,6′-triethyl-acetophenone or 2′,4′,6′-triisopropyl-acetophenone. In contrast, little or no growth of the named grass species was found in the areas treated with either of said compounds.

*Example 6*

Water-dispersible compositions of the type in Example 1 were prepared to contain as active ingredient m-nitro-propiophenone (molecular weight: 179) or 4′-tertiary-butyl-2′,6′-dimethyl-3′,5′-dinitro-acetophenone (molecular weight: 294) and each such composition was dispersed in water to produce an aqueous spray composition containing 0.432 pound of one of said phenone compounds per hundred gallons of ultimate mixture. Each such spray composition was applied by the method of Example 1 to an area of fertile soil previously fitted and planted with seed of radish and Japanese millet. The treating operation applied a substantially uniform dosage of about 50 pounds of one of the named phenone compounds per acre to the treated areas, said dosage corresponding to a concentration of about 80 parts by weight of phenone compound per million parts of soil. When the treated areas were examined about 4 weeks after the applications of the compositions, it was found that there was little or no suppression of growth of radishes in the treated areas, while complete suppression of growth of Japanese millet therein had occurred.

In exactly similar fashion, 2′,4′,6′-triisopropyl-3′-nitro-propiophenone (molecular weight: 305) and 2′,4′, 6′-triisopropyl-3′-nitro-butyrophenone (molecular weight: 319) were applied at a dosage of 20 pounds of one of said phenone compounds per acre to areas planted with seed of the broadleaf plants: radish, pinto bean and marigold, and of the grasses: German millet, crabgrass, sudan grass, meadow fescue, Japanese millet and wild oats. Substantially complete suppression of the grasses was obtained with no observable deleterious effects on the broadleaf species from treatment with either of these substituted phenone compounds.

It should be noted that when excessive amounts of most of the substituted phenone compounds are applied, selectivity is no longer apparent and a more or less general herbicidal action may be accomplished.

*Example 7*

The following composition was prepared by blending the ingredients to form a uniform solution.

| Ingredient | Parts by weight |
|---|---|
| 2′,4′,6′-triisopropyl-3′-nitro-acetophenone | 266 |
| Tween 60 | 20 |
| Emcol P–10–20–D | 30 |
| Xylene | 684 |

Tween 60 is a surface-active dispersing agent identified as a liquid polyoxyethylene-sorbitan monostearate. Emcol P–10–20–D is a surface-active dispersing and wetting agent identified as an alkylaryl sulfonate. The above composition contains 2 pounds of the active substituted phenone compound per gallon and disperses readily in water to form aqueous emulsions suitable for application in conventional agricultural spray equipment.

*Example 8*

A wettable powder composition is prepared by thoroughly mixing 40 parts by weight of 2′,4′,6′-triisopropyl-acetophenone, 2 parts of sodium dodecylbenzenesulfonate, 1 part of sodium lignosulfonate and 57 parts of attapulgite clay and grinding the resulting mixture in a hammer mill. The product is adapted to be dispersed in water to prepare aqueous spray compositions or to be employed as a concentrate for dilution with finely divided inert solids for the preparation of dust compositions.

I claim:

1. A method for controlling the growth of undesired grasses which comprises distributing in the soil and in close proximity to the germinant seen of such grasses a growth-inhibiting concentration of a substituted phenone compound having a molecular weight of at least 179 and characterized by the formula

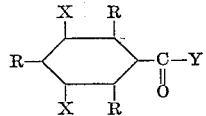

wherein each R is selected from the group consisting of hydrogen and lower alkyl wherein such lower alkyl contains from 1 to 4 carbon atoms, each X is selected from the group consisting of hydrogen and nitro and Y represents alkyl containing from 1 to 3 carbon atoms.

2. A method which comprises contacting seed of undesired grasses positioned in a growth medium with a substantially uniformly distributed dosage of from about 2 to about 50 pounds of a substituted phenone compound per acre, said phenone having a molecular weight of at least 179 and being characterized by the formula

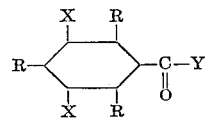

wherein each R is selected from the group consisting of hydrogen and lower alkyl wherein such lower alkyl contains from 1 to 4 carbon atoms, each X is selected from the group consisting of hydrogen and nitro and Y represents alkyl containing from 1 to 3 carbon atoms, inclusive.

3. A method for controlling the growth of undesired grasses which comprises contacting germinant seed of such grasses positioned in a growth medium with a growth-inhibiting concentration of 2′,4′,6′-triisopropyl-acetophenone.

4. A method for controlling the growth of undesired grasses which comprises contacting germinant seed of such grasses positioned in a growth medium with a growth-inhibiting concentration of 2′,4′,6′-triisopropyl-3′-nitro-acetophenone.

5. A method for controlling the growth of undesired grasses which comprises contacting germinant seed of such grasses positioned in a growth medium with a growth-inhibiting concentration of 2′,4′,6′-triisopropyl-3′-nitro-propiophenone.

6. A method for controlling the growth of undesired grasses which comprises contacting germinant seed of such grasses positioned in a growth medium with a growth-inhibiting concentration of 2′,4′-6′-triethyl-acetophenone.

7. A method for controlling the growth of undesired grasses which comprises contacting germinant seed of such grasses positioned in a growth medium with a growth-inhibiting concentration of 2′-methyl-3′,5′-dinitroacetophenone.

References Cited by the Examiner

UNITED STATES PATENTS

| 2,855,439 | 10/58 | Kundiger et al. | 71—2.3 X |
| 2,937,935 | 5/60 | Howard et al. | 71—2.3 |
| 3,013,079 | 12/61 | Pearson et al. | 71—2.3 |

OTHER REFERENCES

King: Agriculture Handbook No. 69, U.S. Dept. of Agriculture, May 1954, pages 5, 6, 38 to 40 and 296.

JULIAN S. LEVITT, *Primary Examiner.*

LEWIS GOTTS, *Examiner.*